Dec. 18, 1962  E. J. PURTZER  3,068,852
FOLDABLE BARBECUE AND GRILL
Filed Dec. 6, 1960  3 Sheets-Sheet 1

Edward J. Purtzer
INVENTOR.

BY *Clarence A. O'Brien*
*and Harvey B. Jacobson*
Attorneys

Dec. 18, 1962   E. J. PURTZER   3,068,852
FOLDABLE BARBECUE AND GRILL
Filed Dec. 6, 1960   3 Sheets-Sheet 2
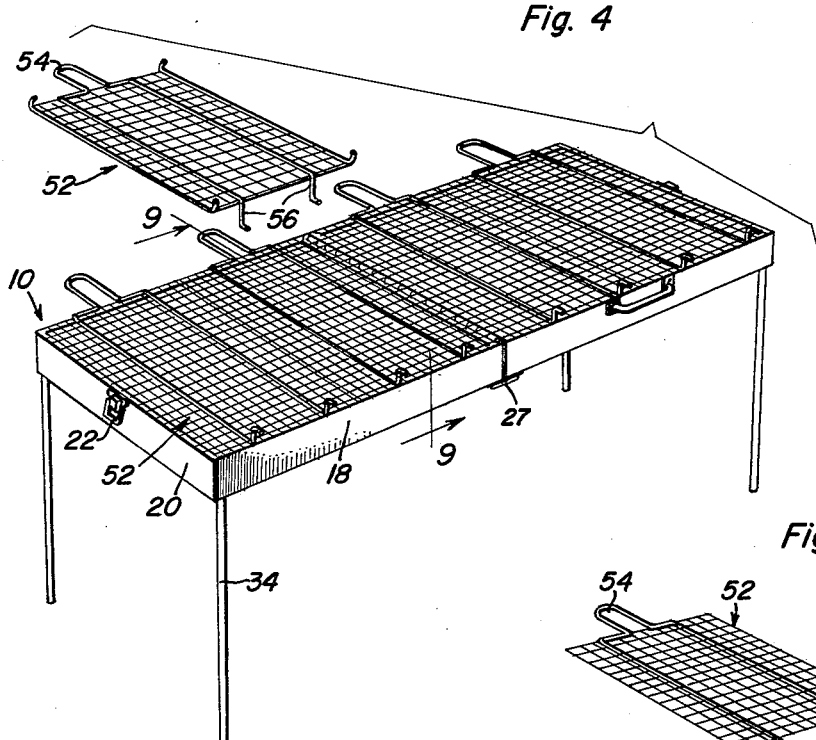
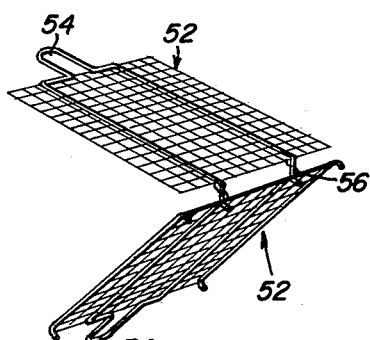
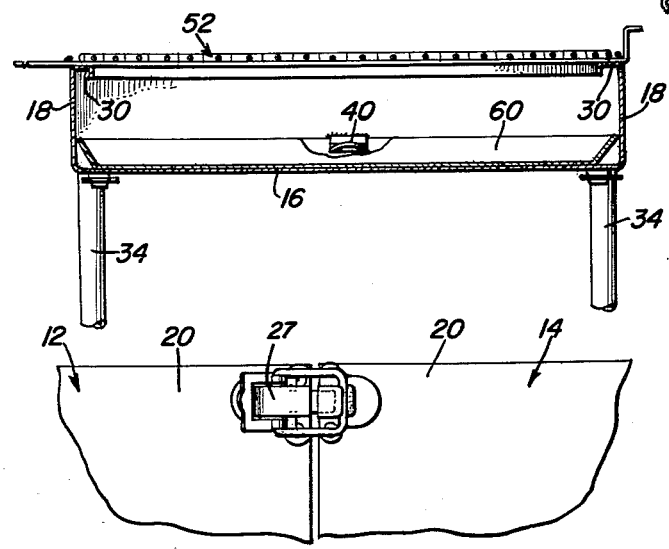
Edward J. Purtzer
INVENTOR.

Dec. 18, 1962  E. J. PURTZER  3,068,852
FOLDABLE BARBECUE AND GRILL
Filed Dec. 6, 1960  3 Sheets-Sheet 3
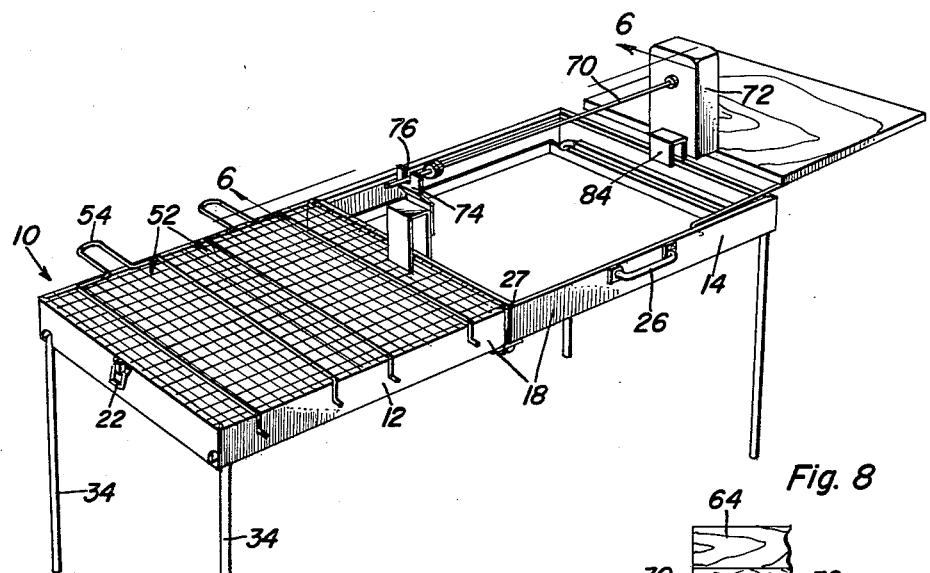
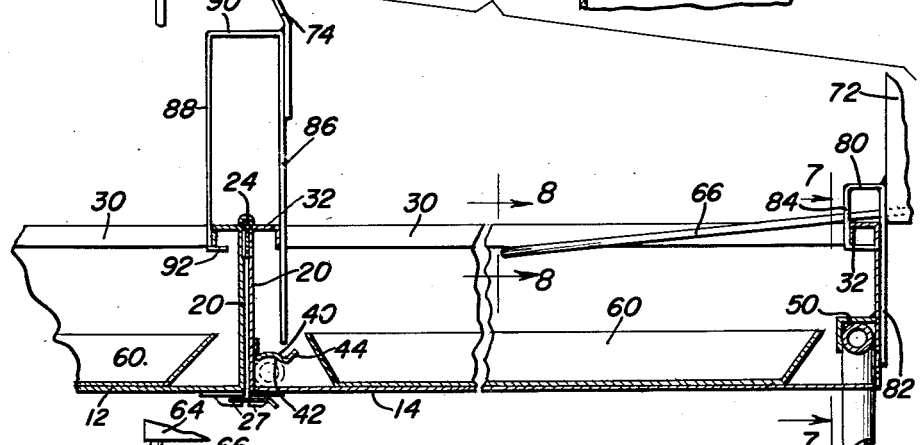
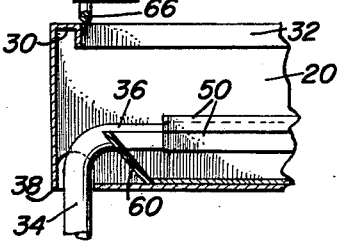
Edward J. Purtzer
INVENTOR.

3,068,852
FOLDABLE BARBECUE AND GRILL
Edward J. Purtzer, Tell City, Ind., assignor to Tell City Metal Products, Inc., Tell City, Ind., a corporation of Indiana
Filed Dec. 6, 1960, Ser. No. 74,066
11 Claims. (Cl. 126—25)

This invention comprises a novel and useful foldable barbecue and grill and more particularly pertains to an outdoor cooking apparatus of a foldable type especially adapted for use by campers, travelers or for picnic purposes.

The principal purpose of this invention is to provide a highly efficient economically constructed portable barbecue and grill capable of being quickly and easily foldable between an operative position for functioning as a complete barbecue and grill and a foldable position in which all of the parts of the device are housed in a most convenient and compact manner.

A very important object of the invention is to provide a barbecue apparatus in accordance with the foregoing object which shall be capable of being constructed from commercially and economically available materials such as sheet metal, rods and tubes, wire screening and the like to thereby reduce the cost of the device as well as the overall weight of the same.

Yet another object of the invention is to provide a barbecue apparatus in accordance with the preceding objects in which two hingedly connected casing sections shall be openable into an open top table-type grill or stove to provide ample cooking space and which may be foldable to provide a compact receptacle in which the legs, grills, spit, a table, and all other components of the apparatus as well as the fuel necessary for the function of the device may compactly and conveniently be stored; and wherein the device shall be folded into a compact bundle of such size as to facilitate its ready transportation and storage in relatively confined spaces.

A further object of the invention is to provide an apparatus in accordance with the preceding objects wherein a supporting leg assembly shall be provided of a convenient arrangement permitting the legs to be retracted into the interior of the device for compact storage of the same, and may be extended through leg receiving openings of the device to provide supporting legs therefor, together with improved and highly efficient retaining means to securely retain the legs in either their retracted or their extended position.

Yet another object of the invention is to provide a device in accordance with the foregoing objects having a readily detachable shelf element capable of being conveniently stored within the device when the same is in folded condition, and which may be readily attached to the device when the latter is in its erected position, all in a secure and improved manner.

A still further object of the invention is to provide a device in accordance with the preceding objects in which provision is made for mounting detachably a barbecue spit upon the device and wherein the mounting means shall further serve to strengthen the structure of the foldable sections of the device.

Another object of the invention is to provide a barbecue apparatus as set forth in the above mentioned objects which shall include a plurality of grill elements capable of being selectively rested upon the side walls of the sections to thus provide a grilling surface for the apparatus; and capable of being readily connectible together in pairs to provide a basket-like container in which meat and other foods may be retained for grilling, broiling or the like.

A further important object of the invention is to provide a device in accordance with the foregoing object wherein the fire chamber shall include readily removable grates and which latter may conveniently comprise wire baskets or the like having a disposable fireproof liner such as metallic foil therein. And a final important object of the invention to be specifically enumerated herein resides in the provision of a device in accordance with the foregoing objects wherein a novel reinforcing flange structure is provided for the side and end walls of the device which will both strengthen the sheet metal material of which the sections of the device are formed and also will provide secure means for locking the shelf or the mounting brackets of the spit assembly thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view showing a device in its completely erected position and with the grills positioned to provide a grilling surface throughout the entire length of the device and with an extra grill element being shown in readiness for attachment to another grill element to form a cooking basket therewith;

FIGURE 5 is a perspective view of the erected device similar to FIGURE 4 but showing the spit assembly in its erected position and showing the shelf attachment of the device in position;

FIGURE 6 is a detailed view taken upon an enlarged scale substantially upon the plane indicated by the section line 6—6 of FIGURE 5, parts being broken away;

FIGURE 7 is a detailed view in vertical transverse section taken substantially upon the plane indicated by the section line 7—7 of FIGURE 6 and showing in particular a portion of the leg structure and the means for securing the same in the extended position of the legs;

FIGURE 8 is a detail view taken substantially upon the plane indicated by section line 8—8 of FIGURE 6 and illustrating the manner in which the shelf is detachably anchored to the sides of a section of the apparatus;

FIGURE 9 is a detail view in vertical transverse section taken substantially upon the plane indicated by section line 9—9 of FIGURE 4;

FIGURE 10 is a perspective view showing the manner in which two of the grill elements are coupled together to provide a foldable basket-like receptacle for containing therebetween meat or other food articles to be grilled, broiled or otherwise heated by the device;

FIGURE 11 is a detail view illustrating a snap fastener construction by which the hinged sections of the device may be locked in their opened positions.

Figure 1:
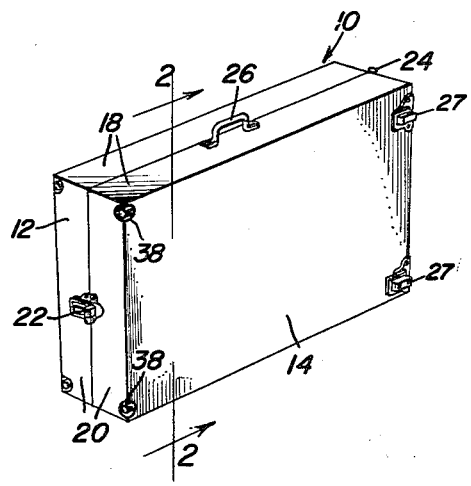
FIGURE 1 is a perspective view showing a preferred embodiment of a foldable barbecue and grill in accordance with this invention, the same being illustrated in a compactly folded position in readiness for transportation or storage and with all of the components of the apparatus being housed therein.
Figure 2:
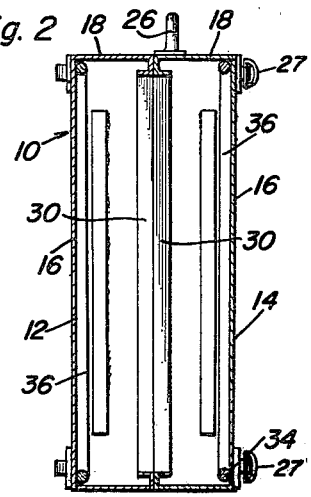
FIGURE 2 is a vertical transverse sectional view taken upon an enlarged scale substantially upon the plane indicated by section line 2—2 of FIGURE 1 and showing the disposition of certain of the components of the device when the apparatus is in its folded position.
Figure 3:
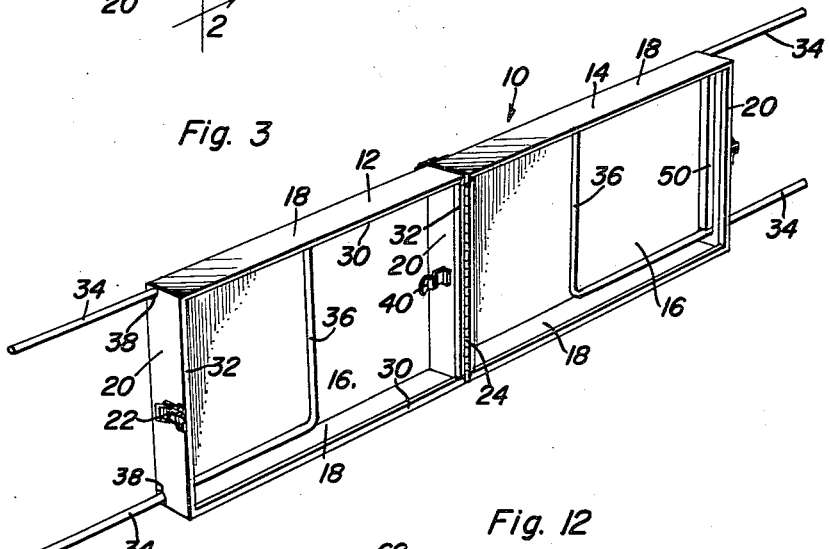
FIGURE 3 is a perspective view showing the two hinged sections of the device in their unfolded position and with the retractable legs partially extended therefrom.

In the accompanying drawings the numeral 10 identifies generally the barbecue apparatus which is shown in its compactly folded condition in FIGURES 1 and 2, and a partially open condition in FIGURE 3 and in fully opened and erected position in FIGURES 4 and 5. In its folded condition the apparatus is compacted into a suitcase-like structure and as will be observed consists of two tray-like sections 12 and 14 which are of substantially identical construction, are complementary to each other and form the two halves of the suitcase-like structure.

Each of the two sections includes a flat bottom wall 16 together with side walls 18 and end walls 20. Two of these end walls 20 are provided with a conventional type of lock or snap fastener 22 by means of which the sections may be secured and locked in their folded position to thus retain the receptacle formed by the two section in their closed position. Two adjacent end walls are hinged together as by a piano-type of hinge 24, this hinge being located upon the opposite end walls from those containing the snap fastener 22 as will be apparent from FIGURE 3. A handle shown at 26 may conveniently be secured to one of the side walls of one of the sections to constitute a hand-grip by means of which the folded article may be readily handled. A lock means 27, see FIGURES 1, 2, 4-6 and 11 of any conventional type, is secured to the adjacent ends of the sections upon their bottom walls to releasably maintain or lock the sections in their open position.

The arrangements is such that when the sections are opened into an endwise alignment as shown in FIGURE 3 as well as in FIGURES 4 and 5, they form two tray-like containers which constitute the firebox of the barbecue apparatus.

It is preferred to form the device 10 of a suitable inexpensive material and for this purpose sheet metal is deemed to be preferable. In order to increase the rigidity and strength of the device when formed of a relatively weak material such as sheet metal, the upper edges of the peripheral end and side walls 20 and 18 are provided with inwardly and downwardly turned flanges indicated by the numeral 30 for the side walls and 32 for the end walls. The flanges 30 and 32, as suggested in FIGURE 2 provide a means by which the two sections may abut against each other in the closed position of the device, thereby contributing to the strengthening of the device. In addition, these flanges as shown in FIGURES 6 and 8 serve not only to stiffen and strengthen and reinforce the upper edges of the side and end walls but also serve to cooperate with hook or anchoring means in a manner to be subsequently set forth.

An important feature of this invention resides in the provision of a novel and improved leg construction and the mounting of the same upon the device. As will be best apparent from FIGURE 3, there are provided a pair of leg assemblies each of a U-shaped configuration and of a unitary rod or tubular element. Each leg assembly includes a pair of parallel legs 34 which are joined by a web portion 36. The two sections 12 and 14, at what may be termed the remote opposite end walls 20 are provided with leg receiving openings or apertures 38 therethrough. These apertures as shown in FIGURE 1 extend both through the end walls 20 and the adjacent bottom walls 16 at their intersections. The legs are of such length that they may be completely retracted into the interior of the sections and thus into the closed or folded receptacle as shown in FIGURES 1, 2 and as will be further apparent from FIGURE 3; or may be fully extended from the interior of the sections so that the webs 36 will engage against the end walls 20, at which time the legs may be swung downwardly in order to thereby support the sections as shown in FIGURES 4-6.

Locking or retaining means are provided for selectively securely retaining the legs in either their fully retracted position or in their fully extended position. For retaining the legs in a retracted position, as shown in FIGURE 6, the two adjacent end walls 20 to which the hinge 24 is applied are provided with resilient brackets or clips 40 having a surface which is outwardly concave with respect to the bottom wall 14, this surface being indicated by the numeral 42. The clips are welded or otherwise fixedly secured to the end walls 20 and at the remote ends therefrom are provided with upturned flanges 44 which facilitates the sliding of the web portion 36 of the leg assemblies therebeneath. When the leg assemblies have been fully retracted and pushed beneath the clips 40 they are resiliently retained in their retracted position.

In order to lock and retain the legs in their extended position in order that they may firmly support the horizontally aligned sections to form the complete oven or bed of the barbecue apparatus, there are provided a pair of channel members 50 which are welded or otherwise fixedly secured to the end walls 20 which are remote from each other and to which the fastener components 22 are secured, these channel members opening downwardly toward the bottom wall 14 but in spaced relation thereto. The arrangement is such that after the legs have been fully extended through the leg receiving openings 38, so that the webs 36 thereof are against the end walls 20, the legs are swung downwardly and may then be pushed upwardly into the channel so that the weight of the device upon the web portion of the legs will retain the legs in the channels and securely locked in extended position of the legs.

It will thus be apparent that the interiors of the sections are provided with retaining means to thus selectively retain the legs in either their fully extended or their fully retracted position and when so extended the legs will be securely retained in a load support manner with respect to the sections to which they are secured.

In order that the device may function as a barbecue grill there are provided a plurality of grill panels, each designated generally by the numeral 52. As shown best in FIGURES 4, 9 and 10, each of the grill panels 52 is preferably rectangular in shape and consists of a screen or mesh of crossed rods or wires. These panels are of sufficient length to rest across each of the sections and be supported upon the side walls 18 thereof as shown in FIGURES 4 and 9. In order to facilitate handling of the grill panels and their selected positioning upon the sections to cover the determined areas thereof, the panels are provided with handles 54 at one end. These handles are formed from a single rod-like element folded upon itself to provide the projecting handle 54 at one end of one of the grills and to provide a pair of hook elements 56 projecting longitudinally and laterally from the other side edge. As will be observed the handle portion is displaced laterally inwardly and between the two side members of the single unitary element while the extremities of these side members being Z-shaped constitute the hook members 56 previously mentioned. The arrangement is such that these hook members may be engaged with an adjacent panel as shown in FIGURE 10 so that two panels can be pivoted or hinged together and thus provide a basket-like container, box or receptacle between which various foods such as meat or the like can be placed and retained to facilitate broiling the same over a fire, turning them and the like.

It will thus be observed that the grills 52 of which there are preferably five, can be employed with two grill panels 52 to cover each of the sections and leaving a fifth grill panel which may be used for any one of these covering grill panels to form the previously mentioned food container shown in FIGURE 10. The size of these grill panels is such that they may be received in and compactly stored in the receptacle when the latter is in its folded condition as shown in FIGURES 1 and 2.

Fire baskets or grates in the form of tray 60 of any desired type are preferably removably placed upon the bottom walls 16 of the sections for the purpose of receiving the fuel, or to catch drippings from meat and the like. In the interest of neatness and cleanliness these trays may conveniently consist of perforated sheet metal or wire mesh members in the form of baskets or the like and a readily disposable material of an inexpensive and fireproof nature such as metal foil and to be placed therein as a lining to receive the bed of coals, catch the drippings and be disposed of after use of the device is terminated.

Figure 12:
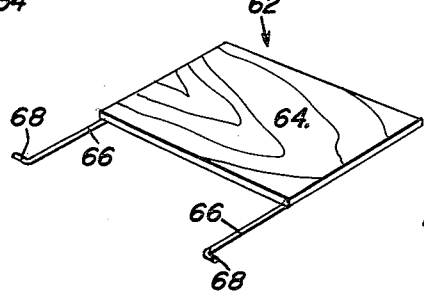
FIGURE 12 is a perspective view of the removable shelf forming a part of the apparatus.

A detachable shelf element designated generally by the numeral 62 is shown in FIGURE 12 and consists of a flat panel 64 comprising a supporting surface such as a shelf and to which a pair of mounting legs 66 are secured in parallel relation. At their outer ends these legs have outturned hooks 68 thereon so that as shown best in FIGURES 5, 6 and 8, the shelf may be disposed at one end of the device with the legs 66 resting across the flange 32 of a section and with the outturned hooks being received beneath the flange 30 of the side walls of the section. The inherent lateral springiness of the material of the legs enables the hook members to readily engage or disengage beneath the flange 30 of the side walls.

When not in use, the shelf section can be stored within the device as previously mentioned in order to permit compact folding of the same.

The apparatus further includes a spit construction to facilitate barbecuing of meat. For this purpose there is provided a removable rotatable spit 70 which has one end thereof inserted into and connected to a suitable electric motor, not shown, provided in the housing which is formed by a support member 72. A further support member 74 having a spit receiving notch 76 at its upper end is provided so that the spit may be readily connected to the motor within the support 72 and carried by the support 74 to effect turning of the spit and of the meats carried thereon in a conventional manner. The supports 72 and 74 are themselves detachably mounted upon one of the sections. Thus, as will be more clearly apparent from FIGURE 5 in conjunction with FIGURE 6, the support 72 is welded or otherwise connected to a bracket 80. This bracket has a vertically extending plate 82 which abuts against the side of the exterior surface of the end wall 20 of the adjacent section and further has a forwardly downwardly and back turned flange member 84 which overlies and hooks under the end wall flange 32.

The mounting means for the support 74 likewise consists of a mounting bracket which is of generally U-shaped configuration having a relatively long vertical leg member 86 and a relatively shorter parallel vertical leg 88 which are joined at the upper end by integral web 90. The spacing of the two legs 86 and 88 is such that they will resiliently grip the two adjacent flanges 32 of the two adjacent end walls 20 of the two sections while the short leg 80 has inturned locking or anchoring flanges 92 which underlie the corresponding flange 32 to thus firmly secure the mounting means in place. This mounting means thus serves not only to support the end of the spit but also serves to brace and reinforce the adjacent end walls of the two sections by the gripping engagement of the mounting means with the end flanges 32.

From the foregoing it will be apparent that there has been provided a portable grill and barbecue apparatus which may be very inexpensively constructed of readily available, lightweight inexpensive materials; yet is sturdy and durable in its construction by virtue of the reinforcements and the various locking means and brace means provided. Further, a very sturdy leg assembly is provided which is completely retractable into the device and yet when extended will be securely retained in a load supporting position. Still further, the device is so constructed that every component of the same including the legs, the grills, the spit assembly, the shelf, the mounting means for the spit and even the fuel which is to be utilized are all compactly stored within the device. The contour and shape of the apparatus is such that it can be readily carried in extremely cramped quarters such as are frequently found in automobiles and the like rendering the device easy to transport and to store when not in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A foldable barbecue and grill comprising a pair of complementary tray-like sections, a hinge, said hinge connected to one end of each tray-like section for folding one section upon the other to a closed position and opening to a position of straight alignment and comprising a portable suitcase-like package and in its open position a side-by-side straight alignment to form a barbecue and grill, each section including a flat sheet metal and imperforate bottom wall having imperforate marginal side and end walls thereon, said sections in their closed position comprising a container for housing all portions of said barbecue and grill, said sections having the marginal edges of said side and end walls turned inwardly and downwardly to provide downwardly opening U-shaped channel members along and upon the insides of the upper edges of said side and end walls, a pair of supports, one support straddling the hinge and mounted upon the U-shaped channel member at the one end of each of the tray-like sections, the other support mounted upon the U-shaped channel member of the other end of one of the tray-like sections for supporting a spit means therebetween.

2. The combination of claim 1 including a bracket for each support engageable with a U-shaped channel member of the one end wall of each tray-like section and the U-shaped channel member of the other end of one of the tray-like sections.

3. The combination of claim 2 wherein said brackets have a hooked engagement with the marginal edges.

4. A foldable barbecue and grill comprising a pair of complementary tray-like sections hingedly connected to each other at one end of each for folding upon each other to a closed position constituting a portable suitcase-like package and to an open position in side-by-side straight alignment to form a barbecue and grill, cooperating fastening means on the other end of each section for releasably securing said sections in said closed position, means for locking said sections in their open aligned position, each section including a bottom wall having marginal side and end walls thereon, each section having at said other end thereof a pair of leg-receiving openings, said openings being each disposed in the adjacent portions of both said bottom wall and the other end wall, a U-shaped leg member in each section including a pair of legs slidable through said pair of openings and a mid-portion rigidly uniting said legs, said legs being slidably retracted into a section and slidably extensible therefrom through said openings, fasteners in each section at opposite ends thereof releasably engaging the mid-portions of said members for selectively retaining the latter in retracted and in extended positions.

5. The combination of claim 4 wherein one of said fasteners comprises a clip embracing one of the leg members at its mid-portion and releasably retaining the latter against the bottom wall of its section in retracted position therein.

6. The combination of claim 5 wherein the other of said fasteners comprises a channel member inside said section and secured to said other end wall thereof and opens toward said bottom wall above said openings for receiving said leg member mid-portion.

7. The combination of claim 4 wherein one of said fasteners comprises a channel member inside said section and secured to said other end wall thereof and opens toward said bottom wall openings for receiving said leg member mid-portion.

8. The combination of claim 4 wherein said leg openings are formed in the adjacent edges of said bottom and said other end walls.

9. The combination of claim 4 including support means removably mounted upon said sections in their aligned open position for supporting a barbecue spit and motor.

10. The combination of claim 4 including a plurality of grills each adapted to overlie said bottom wall and rest upon a pair of side walls of a section.

11. The combination of claim 4 including a shelf for an end of one section, said shelf including a pair of parallel legs projecting therefrom and terminating in hooks, said legs being rested upon the other end wall of said one section and said hooks being engageable in the side walls of said one section whereby to anchor and support said shelf.

References Cited in the file of this patent

UNITED STATES PATENTS

| | | |
|---|---|---|
| 1,091,877 | Collis | Mar. 13, 1914 |
| 1,491,080 | Clark | Apr. 22, 1924 |
| 1,741,400 | Bocchino | Dec. 31, 1929 |
| 2,221,098 | Langsam | Nov. 12, 1940 |
| 2,477,529 | Sprinkle et al. | July 26, 1949 |
| 2,530,166 | Johannsen | Nov. 14, 1950 |
| 2,552,861 | Overman | May 15, 1951 |
| 2,565,000 | Schultz | Aug. 21, 1951 |
| 2,609,072 | Levinson | Sept. 2, 1952 |
| 2,791,959 | Pirz | May 14, 1957 |
| 2,918,051 | Broman | Dec. 22, 1959 |

FOREIGN PATENTS

| | | |
|---|---|---|
| 602,957 | Canada | July 20, 1957 |